Feb. 3, 1931. W. E. BURKS 1,791,400
COFFEE URN
Filed March 21, 1930 2 Sheets-Sheet 1
Fig.1.
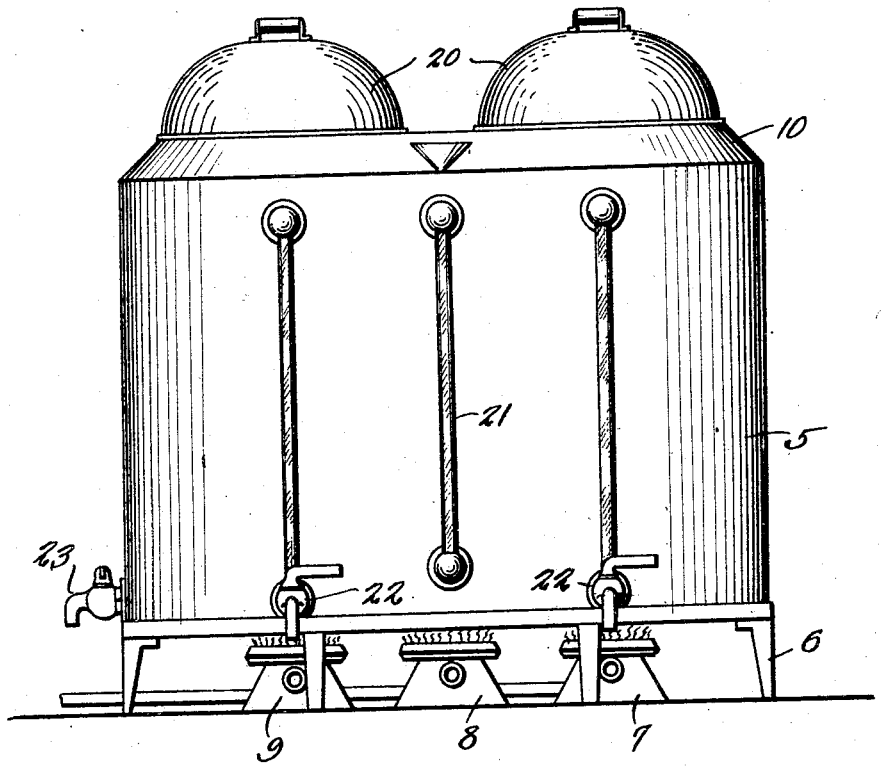
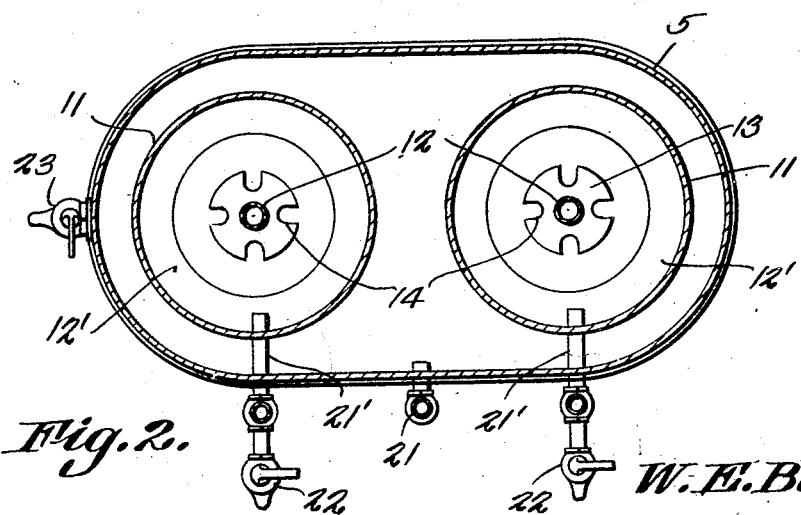
Fig.2.
W. E. Burks
Inventor
By C. A. Snow & Co.
Attorneys

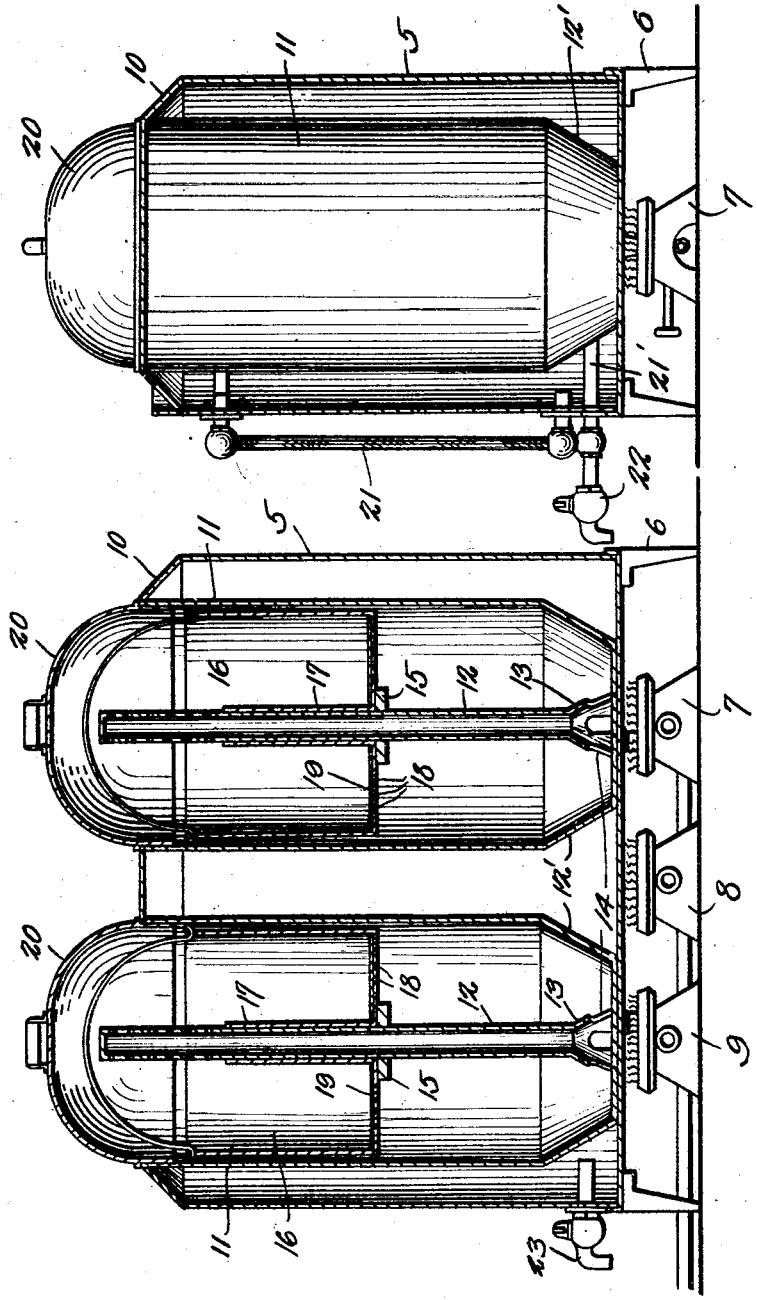

Patented Feb. 3, 1931

1,791,400

UNITED STATES PATENT OFFICE

WILLIAM E. BURKS, OF SAN ANTONIO, TEXAS, ASSIGNOR OF ONE-HALF TO AUGUST A. GITTINGER, OF SAN ANTONIO, TEXAS

COFFEE URN

Application filed March 21, 1930. Serial No. 437,922.

This invention relates to coffee urns or percolators, and aims to provide novel means whereby the coffee in the percolator may be retained in a heated condition after it has been made, and without the necessity of continuing the percolating operation.

An important object of the invention is to provide a coffee urn or percolator of this character wherein the receptacles for containing the coffee grounds may be readily and easily removed to facilitate the cleaning thereof, the receptacles being of a construction to retain the coffee without the necessity of using the usual sack or bag.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a front elevational view of a coffee urn or percolator, constructed in accordance with the invention.

Figure 2 is a transverse section view.

Figure 3 is a longitudinal sectional view through the body portion of the urn or percolator.

Figure 4 is a sectional view taken at right angles to Figure 3.

Referring to the drawings, the reference character 5 designates the body portion of the urn or percolator, and as shown is supported on the leg members 6, providing a space under the body portion for the burners 7, 8 and 9 respectively.

The body portion is provided with a removable cover 10 which is formed with openings to accommodate the containers 11 that are formed with inclined lower ends 12, as clearly shown by Figure 3 of the drawings.

Removably supported in each container 11, is a vertical tube 12 which is formed with a flared lower end portion 13 provided with openings 14, through which the water in the container may pass into the tube. Mounted on each tube 12, at a point substantially intermediate the ends thereof, is a supporting member 15 that provides a rest or support for the coffee ground container 16, which is in the form of a receptacle having an upstanding central tube 17 of a diameter to fit around the vertical tube 12 with which the coffee ground container is associated.

Thus it will be seen that due to this construction the coffee ground container will be held in its proper position within the container.

Openings 18 are formed in the bottom of the coffee ground containers so that liquid passing through the coffee grounds may pass from the containers 16 and drop into the lower portions of the containers 11, where the coffee may be drawn off for consumption. Positioned in the bottom of each coffee ground container 16, is a removable member 19 formed preferably of filtering paper, to the end that the coffee passing from the containers 16 will be thoroughly filtered.

As clearly shown by the drawings, the tubes 12 extend appreciable distances above the upper ends of the coffee ground containers 16, and are provided with a plurality of lateral openings so disposed that water passing upwardly through the tubes, may be directed laterally through the openings of the tubes, where the water will fall onto the coffee held in the containers 16.

Bails are provided on the coffee ground containers 16 and provide means whereby the coffee ground containers may be readily and easily removed for cleaning purposes. Covers 20 are provided for closing the openings in the removable cover 10.

The body portion proper is supplied with a gauge 21, whereby the amount of water in the body portion, and surrounding the containers 11, may be determined at a glance.

The coffee after it has been made, is drawn from the containers 11, through the pipes 21 that are supplied with spigots 22.

A spigot 23 extends into the body portion 5, and provides means whereby the water in the body portion may be drained therefrom.

In the use of the device, ground coffee is placed in the containers 16 and the containers 11 are supplied with the proper amount of water to insure percolation. The burners 7 and 9 are lighted, causing the water in the containers to boil and discharge into the containers 16, through the openings in the upper extremities of the tubes 12. After the coffee has percolated for the required length of time, the burners 7 and 9 are cut off and the burner 8 lighted to heat the water in the body portion 5 to maintain the coffee in a heated condition.

As the water in the container becomes hot, the coffee in the containers 11 will be maintained in a hot condition without the necessity of continuing the percolating operation.

I claim:

In a percolator, a body portion having openings near its ends, containers mounted in the body portion and positioned in the openings, the containers resting on the bottom of the body portion, said containers being spaced apart and spaced from the wall of the body portion, the lower ends of the containers being inclined inwardly providing a wide space at the lower ends of the containers between the containers, said body portion adapted to contain water, burners under the body portion directly under the containers, and a burner disposed directly under the space between the containers to heat the water in the body portion.

In testimony that I claim the foregoing as my own, I have hereto affixed my signature.

WILLIAM E. BURKS.